United States Patent [19]

Akado et al.

[11] 4,130,405

[45] Dec. 19, 1978

[54] AIR CLEANER ARRANGEMENT

[75] Inventors: Hajime Akado; Hiroshi Ueda; Akira Yamashita, all of Kariya; Takemasa Tamura, Toyota, all of Japan

[73] Assignee: Nippondenso Co., Ltd., Kariya, Japan

[21] Appl. No.: 756,963

[22] Filed: Jan. 5, 1977

[30] Foreign Application Priority Data

Jan. 12, 1976 [JP] Japan .................... 51-1833[U]
Jan. 12, 1976 [JP] Japan .................... 51-1834[U]

[51] Int. Cl.² ............................................ B01D 46/24
[52] U.S. Cl. .................................... 55/503; 55/510; 220/306
[58] Field of Search ................. 55/498, 503, 509, 510, 55/DIG. 28; 210/450, 451, 453; 285/162, 194, 222; 220/306, 307

[56] References Cited

U.S. PATENT DOCUMENTS

| Re. 28,521 | 8/1975 | Hammes | 220/306 |
| 2,147,239 | 2/1939 | Buchanan | 285/222 |
| 2,543,909 | 3/1951 | Hatheway, Jr. | 285/194 |
| 2,966,373 | 12/1960 | Yount | 285/222 |
| 3,002,870 | 10/1961 | Belgarde et al. | 55/510 |
| 3,077,284 | 2/1963 | McLaughlin | 220/306 |
| 3,218,785 | 11/1965 | Tietz | 55/510 |
| 3,474,928 | 10/1969 | Hurtt | 220/306 |

FOREIGN PATENT DOCUMENTS

| 1107745 | 1/1956 | France | 220/306 |
| 1482171 | 5/1967 | France | 220/306 |
| 1025316 | 4/1966 | United Kingdom | 220/306 |

Primary Examiner—Frank W. Lutter
Assistant Examiner—David L. Lacey
Attorney, Agent, or Firm—Cushman, Darby & Cushman

[57] ABSTRACT

An air filter container arrangement with improved male and female connectors to detachably connect the cover and casing and also the casing and air inlet pipe.

15 Claims, 15 Drawing Figures

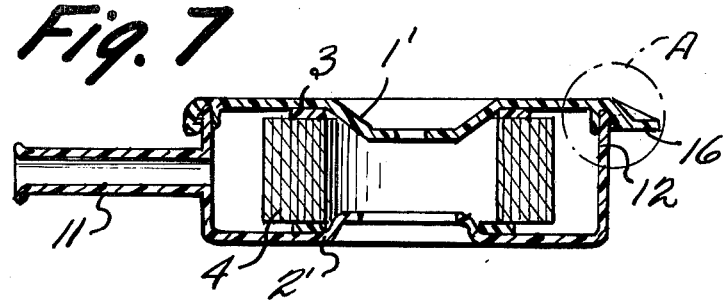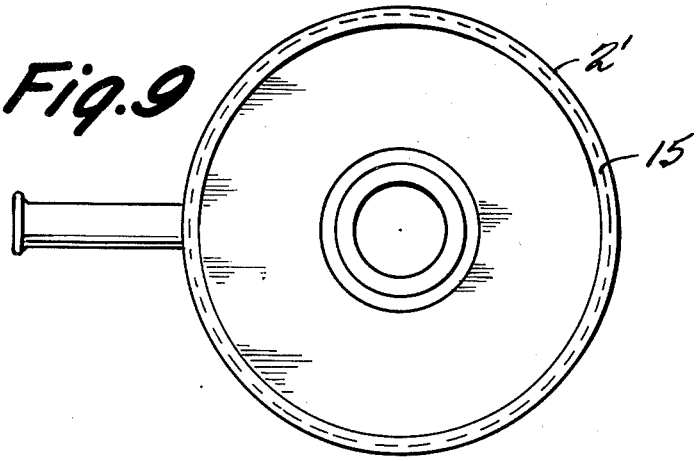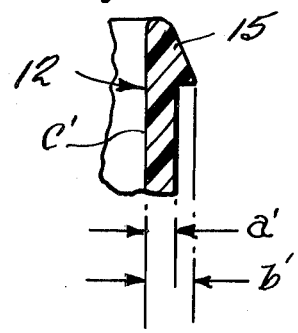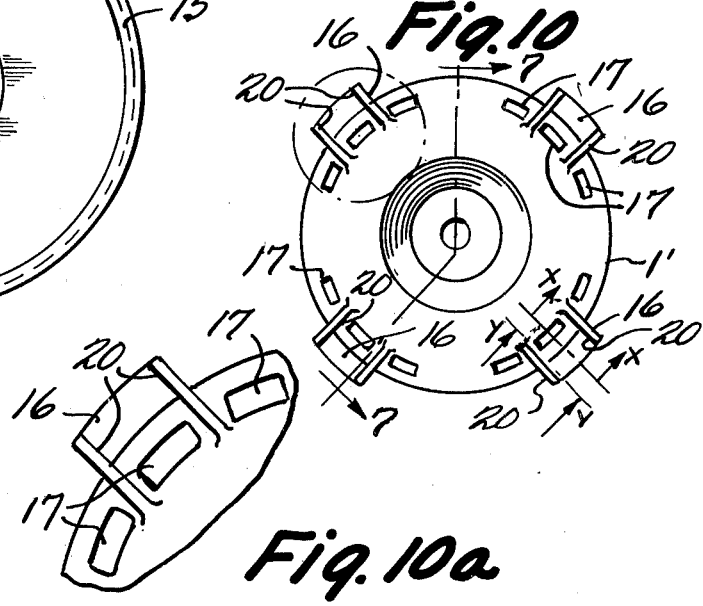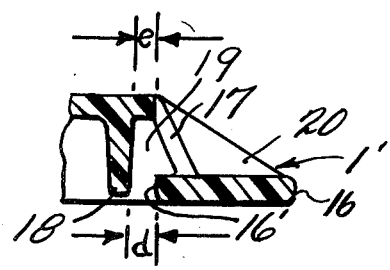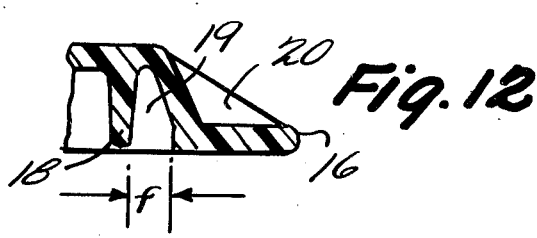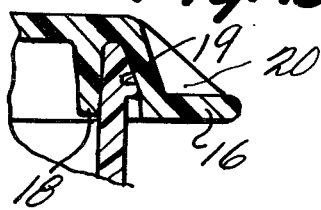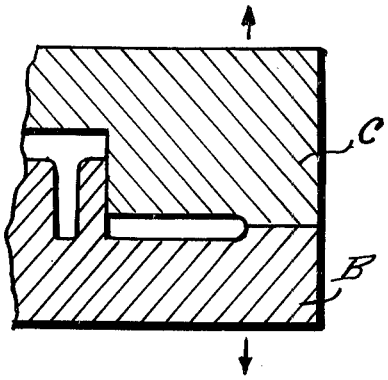

AIR CLEANER ARRANGEMENT

FIELD OF THE INVENTION

This invention relates to air cleaners for internal combustion engines, and in particular to novel connection means between the casing of an air cleaner and its cover or its air inlet pipe.

BACKGROUND OF THE INVENTION

Many arrangements have been proposed in the past to connect an air inlet pipe to the casing of an air cleaner for internal combustion engines, and for connecting the caps or cover member to such a casing. These prior art methods include bolting, riveting and the like, all of which have certain drawbacks which are explained in more detail in the specification below.

SUMMARY OF THE INVENTION

It is accordingly an object of the present invention to improve internal combustion engine air cleaners, particularly to provide an air cleaner with a more readily engageable and detachable cover or cap and air inlet pipe, the processes for making same being considerably easier and the products better. Various embodiments of the invention are described below in connection with the drawings in which:

FIG. 7 is a cross sectional view of another embodiment of the air cleaner of this invention taken generally along line 7-7 of FIG. 10;

FIG. 8 shows an enlarged cross sectional view of a portion of the upper end connector of the air cleaner casing of FIG. 7;

FIG. 9 shows a plan view of the FIG. 7 air cleaner with its cover and filter element removed;

FIG. 10 shows a plan view of the cap of FIG. 7;

FIG. 10a shows an enlarged plan view of a portion within the broken line circle in FIG. 10.

FIG. 11 shows a cross sectional view of a portion of FIG. 10 along the line X—X;

FIG. 12 shows another cross sectional portion taken along the line Y—Y of FIG. 10;

FIG. 13 shows an enlarged cross sectional view of the part within circle A of FIG. 7; and FIG. 14 shows a cross sectional view of dies used in making the FIG. 7 air cleaner cap.

DETAILED DESCRIPTION OF THE DRAWINGS

Figure 1:
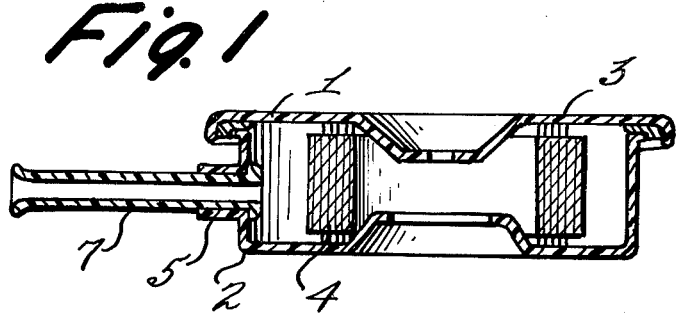
FIG. 1 is a cross sectional view of a first embodiment of an air cleaner according to the present invention.

In FIG. 1 the air cleaner is shown with a cap or cover member 1 which closes a cup-shaped casing member 2 in which is disposed an annular filter element 4 held therein in a conventional manner as by gaskets 3 at the upper and lower sides of element 4. Cover member 1 is secured to casing 2 in any desired manner, for example by a conventional bolting arrangement (not shown) with a gasket between the upper rim of the casing and cover.

Figure 2:
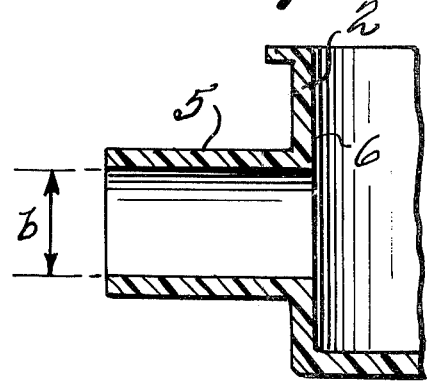
FIG. 2 shows an enlarged cross sectional view of a branch pipe and its nearby parts of the FIG. 1 air cleaner.

As shown in the FIG. 2 enlarged partial view of FIG. 1, casing 2 has a vertical side wall with an interior flat surface 6 in which is formed an aperture and from which integrally extends outwardly a branch pipe 5 with an internal diameter of b.

Figure 3:
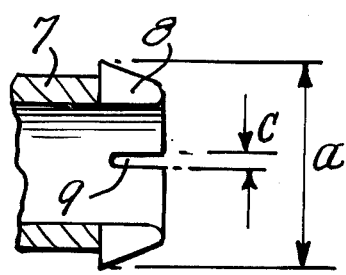
FIG. 3 shows an enlarged cross sectional view of the connecting end portion of the air inlet pipe of the FIG. 1 air cleaner.
Figure 4:
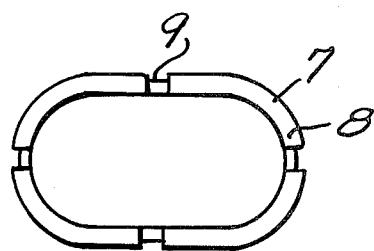
FIG. 4 shows a right end view of FIG. 3.

As shown in FIG. 1, it is desired to have an air inlet pipe, as is conventional, but in this invention the inside (right) end of the inlet pipe is enlarged and shouldered as shown more clearly in FIG. 3. The enlarged end 8 also has at least one longitudinally extending slit 9 in its side wall, and preferably as shown in FIG. 4 has four such slits 9.

In the above described construction, when the air inlet pipe 7 is to be installed with the casing 2, pipe 7 is pushed into the branch pipe 5. Since the end 8 of inlet pipe 7 has a maximum diameter a which is larger than the internal diameter b of branch pipe 5, the inlet pipe stops momentarily when its enlarged end 8 begins to exceed the internal diameter b of branch pipe 5. However, it is to be understood that at least the enlarged end portion 8 of inlet pipe 7, and preferably the whole pipe itself, is made of synthetic resin, such as polypropylene, having a thermoplastic characteristic and a certain degree of elasticity. Hence, upon pushing air inlet pipe 7 towards the inside of casing 2, the enlarged end 8 of inlet pipe 7 will elastically reduce its maximum diameter sufficient to pass through branch pipe 5 so that the enlarged end 8 can protrude into casing 2. Slits 9 aid in allowing enlarged end 8 of inlet pipe 7 to decrease by the dimension c of each slit, so that the maximum dimension a of the enlarged end 8 can readily reduce to the interior diameter b of branch pipe 5 while the enlarged end is being pushed therethrough. As soon as the enlarged end 8 is moved into the interior of casing 2, it resiliently returns to its normal shape as shown in FIG. 3, and its shoulder comes to rest fixedly against the flat inside surface 6 of casing 2.

If desired, casing 2 and its branch pipe 5 may be made of the same synthetic resin material as above described for inlet pipe 7, though the elasticity or resiliency feature desired for at least the enlarged end 8 of inlet pipe 7 is not essential for casing 2.

It will be noted in the FIG. 1 embodiment that both the branch pipe 5 and inlet pipe 7 are straight pipes. If desired, a collar or the like can be placed about inlet pipe 7 to prevent any possible inward movement thereof from its position shown in FIG. 1, though due to the relative dimensioning and resiliency of inlet pipe 7 such is not normally necessary.

Figure 5:
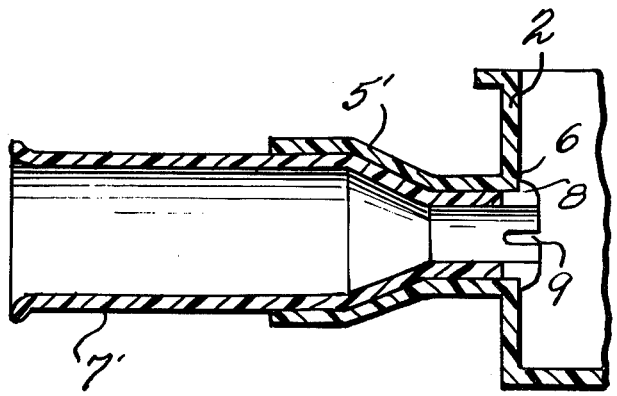
FIG. 5 shows an enlarged cross sectional view of a part of another embodiment of the present invention.
Figure 6:
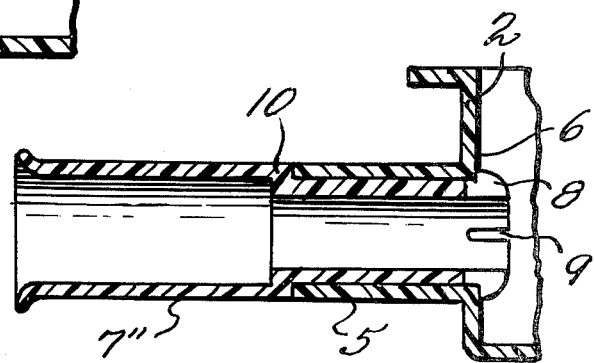
FIG. 6 shows an enlarged cross sectional view of a part of a third embodiment of this invention.

Two other ways of preventing inlet pipe 7 from being pushed too far into the interior of casing 2 are shown in FIGS. 5 and 6. In FIG. 5, branch pipe 5' is not straight throughout its length, but has a right end portion with an internal diameter b as in FIG. 2, following which it flares or diverges toward its outer end for a distance after which its diameter becomes constant at a larger value. Inlet pipe 7' has the same enlarged end 8 and slits 9 as above described relative to FIGS. 3 and 4, but it too has a nonconstant diameter along its length. As is readily apparent from FIG. 5, the external diameter of inlet pipe 7 is complementary to the internal diameter of branch pipe 5' throughout the distance that they are coextensive. In this manner, the tapering portion of inlet pipe 7', in cooperation with the complementary part of branch pipe 5', prevent inlet pipe 7' from being pushed any further into casing 2 than necessary for the shoulders of the enlarged end 8 to come tightly to rest against the flat internal surface 6 of casing 2. This arrangement makes a very firm connection between the inlet pipe 7' and casing 2 and its branch pipe 5'.

The same function is accomplished by the different arrangement in FIG. 6, wherein branch pipe 5 is the same as in FIG. 2. However, inlet pipe 7", after its flared left end, has a constant external diameter which extends rightwardly to the outer end of branch pipe 5, at which point the inlet pipe 7" has a stepped restriction 10 which reduces the diameter of inlet pipe 7" to the internal diameter b of branch pipe 5, up to the shouldered enlarged end 8 of the inlet pipe. Again, the inlet pipe in the FIG. 6 embodiment is fixedly secured to casing 2 without potential of movement inwardly or outwardly upon the inlet pipe being accidentally or otherwise forced in either direction.

In any of the embodiments described above, should the inlet pipe 7, 7' or 7" or casing 2 become damaged or for other reasons need replacement, the two parts may be separated by removing cover 1 and filter 4 and forcing a reduction in the enlarged end 8 of the inlet pipe while the pipe is being pulled outwardly through the branch pipe 5 or 5'.

The foregoing embodiments in FIGS. 1-6 are an improvement over the air cleaner arrangement disclosed in Japanese Utility Model Application No. 50-107751, filed in Japan on Aug. 2, 1975. In that Japanese application, the air inlet pipe is not secured to the inside surface of the casing as opposed to the construction of the present invention described above, but instead the outer end of the branch pipe is enlarged and contains an inset shouldered recess complementary to the enlarged end or lip 8 in FIG. 3, for example, above. An alternative arrangement described in that Japanese application is the reversal of the male-female connectors for the inlet and branch pipes, i.e., the outer end of the branch pipe is constructed like FIG. 3 above and the inner end of the inlet pipe contains an inset complementary shouldered recess. It has been found, however, that such an inset shouldered recess, i.e., a recess which has toward its outer end a radially extending step or shoulder, requires complex dies and complex molding processes. Because of such complexities, the molded recesses are more likely to vary in pertinent dimensions from one part to another, causing a poor workability or inferior connection between the male and female connectors. The embodiments described above as to FIGS. 1-6, however, obviate such problems since the branch pipe does not require an inset shouldered recess because the inlet pipe has the shoulder of its enlarged lip 8 hooked or latched to the normal flat surface of the side wall of casing 2. In the present invention, there is no female connector as such which cooperates with the enlarged shouldered lip 8, but lip 8 having its shoulder always in contact with a flat surface eliminates the previous requirement for tolerances in the part which connects with the shoulder of lip 8. Accordingly, the complex dies and molding processes for the branch pipe used in the aforesaid Japanese application are also eliminated, without eliminating a secure connection of the inlet pipe.

The above embodiments in FIGS. 1-6 also represent improvements in conventional air cleaners which have their casing and inlet pipe made of synthetic resin and are bolted, riveted or similarly connected together. Such an arrangement makes the production process more complex and higher priced than the embodiments described in FIGS. 1-6.

Further embodiments of an internal combustion engine air cleaner are shown in FIGS. 7-14. These embodiments relate mainly to the connection of the cap or cover member 1' to the casing 2' as is discussed in more detail below. in the embodiment shown in FIG. 7, the air inlet pipe 11 is integral with casing 2'. However, it should be understood that any of the arrangements above described relative to FIGS. 1-6 may be employed to secure a separate inlet pipe to casing 2'. Likewise, any of the embodiments described below relative to securing the cover member 1' to the casing may be employed with any of the embodiments in FIGS. 1-6.

In FIG. 7, the annular filter element 4 is held in place by the configuration of the cup-shaped casing 2' and cap or cover member 1' in conjunction with the intervening gaskets 3, as in the embodiment of FIG. 1.

Integrally connected to the lower or bottom part of the annular casing 2' is an upstanding circumferential side which terminates in an upper end connection portion 12 shown in FIG. 8. This connection portion has a first or upper part 15 which is of rounded nose shape having a maximum dimension b'. A horizontal inwardly extending latching shoulder divides the upper part 15 from the lower part which has a narrower width a'. Connector portion 12 has an inside surface c'.

A plan view of only the cap or cover member 1' of FIG. 7 is shown in FIG. 10, and FIGS. 11 and 12 illustrate respective cross sections of that cover member along lines X—X and Y—Y. As shown in FIG. 10, and 10a, cover member 1' has four flanges or tabs 16 equally spaced about its periphery, and in and around those flanges 16 are respective groups of three slits 17.

As is evident from FIG. 11, the cover member 1' has a recess 19 which is complementary to connector 12 of FIG. 8. Recess 19 extends all the way around cover member 1' and is formed on its inner side by a downwardly extending annular member 18. In FIG. 11 flange 16 extends inwardly of the maximum dimension f (see FIG. 12) of the lower part of recess 19, to form a horizontally extending shoulder 16' leaving a lower opening having a width d. The arcuate length of this shoulder 16' is substantially coextensive with the arcuate length of the middle one of the slits 17 of each group associated with a flange 16. On opposite sides of each of the middle slits 17 are respective reinforcing ribs 20 as diagrammatically shown in FIG. 10. As shown in FIGS. 11-13, ribs 20 connect their respective flanges 16 to the upper part of cover member 1'. In between slits 17 the outside wall of the recess 19 is solid as shown in FIGS. 12 and 13, and where this solid wall exists the inwardly directed shoulder 16' of FIG. 11 does not exist.

To place cover member 1' onto casing 2', flanges 16 are pushed or pulled upwardly, for example two adjacent flanges at one time followed by the remaining two at another time if just one person is doing the job with his two hands. Upward force on flanges 16 pivots the outer wall of recess 19 about its upper portion so as to widen the gaps between the shoulders 16' and the annulus 18. That is, the width d in FIG. 11 is normally less than the width b' of the casing connector 12 of FIG. 8, but forcing flange 16 upwardly spreads the opening between shoulder 16' and annulus 18 sufficiently for the upper part of connector 12 to be inserted into recess 19 so that their respective shoulders lock the two connectors together when the force on 16 is released so that the width d re-occurs between the extremity of shoulder 16' and annulus 18. Width d is normally slightly less than width a' of connector 12, but surface c' of connector 12 makes firm contact with the outer surface of annulus 18, as shown in FIG. 13, and this contact extends for the full circumferential length of recess 19 since width f in FIG. 12 is equal to width b' in FIG. 8. It should be noted that width e in FIG. 11 may be equal to or slightly less than width d.

To detach the cover member 1' from the casing 2', again the flanges 16 are moved upwardly, one or more at a time, to release the hooked connector 12 from the respective latching shoulders 16'.

It should be appreciated that the cover member connector as shown in FIGS. 11 and 12 and the casing connector 12 of FIG. 8 can be interchanged in their roles, i.e., reversed so that the connector 12 becomes a downwardly extending connector integral with the cover member, while the other connector of FIGS. 11 and 12 is turned upside down to become an integral portion of the upper end of casing 2'.

Another variation of the embodiments discussed above is that any one or more of the flanges 16 can each have one or more radially extending slits (not shown) at their outer edge to aid in the workability during push or pulling of flanges 16.

The above embodiments described relative to FIGS. 7–13 and the variations thereof, are improvements over the embodiments described in Japanese Utility Model Application No. 50-107752 filed in Japan on Aug. 2, 1975. In that 50-107752 Japanese application, no provision was made for slits 17 or the lower portion of recess 19 having a full width f as described above especially relative to FIGS. 11 and 12. Instead, in that Japanese application No. 50-107752, the inward extension of the flanges to form a shoulder such as 16' in FIG. 11 above, extended through the full arcuate length of each of the flanges as opposed to just substantially the arcuate length of the middle one of the slits 17. Consequently, the present invention, relative to the embodiments described in that prior Japanese application No. 50-107752 is much more workable. While in both cases the casing and cover member are preferably made of a synthetic resin of the thermoplastic type having a certain degree of elasticity or resiliency, such as polypropylene, the provision of the slits 17 makes it easier to operate the flanges 16 for engaging or disengaging the cover from the casing. Furthermore, the molding process for making the cover and its connector is considerably simplified because the slits 17 are provided on the sloping side portion for short arcuate lengths with shoulders 16' being also of short arcuate lengths. In other words, by using dies such as the lower and upper dies B and C in FIG. 14 for molding the recess 19, it is apparent that the dies can be readily separated vertically with ease after the molding process is completed. This is not the situation with regard to making the cap connector in the aforesaid Japanese application No. 50-107752. That is, the existence of the annular shoulder or step in the recess cap connector in that prior Japanese application requires a complex die which is not easy to open, and hence the reproducibility within desired tolerances is unavailable in the molding process required by that prior Japanese application. The resulting large randomness of the shapes of the cap connector member decreases the desired secure engagement of the cap and casing. These problems are fully overcome by the present invention.

What is claimed is:

1. An engine air filter container for use with an air filter element comprising, a cup-shaped casing member constructed to contain said air filter element, said casing having an open top, a bottom and upstanding from the periphery of said bottom a circumferential side terminating in an upper end first connection portion, a cover member having an outer edge second connection portion, said cover member being disposed to cover said open top and said members being detachably connected by said first and second connection portions, said connected casing and cover members forming an enclosure having air inlet and outlet means, one of said first and second connection portions having a vertically disposed first part of given radial width and connected thereto a vertically disposed second part with an enlarged lip of given maximum width radially greater than said given radial width, said one connection portion including a first horizontally disposed latching shoulder extending from said lip at its maximum width to said first part, the other of said first and second connection portions for the other of said members being resilient and including means forming a circumferentially extending vertically disposed recess including a first recess part having radially a maximum width recess approximating said given maximum width and vertically extending therefrom a second recess part having a recess width radially less than said given maximum width, said recess forming means including a second horizontally disposed latching shoulder extending from said first recess part at its maximum width to said second recess part to form a side thereof and being locked with said first shoulder by said lip being in said first recess part to cause said casing and cover members to be detachably connected as aforesaid, and manually operable flange means arcuately extending radially outwardly of the said other connection portion for spreading the width of said recess at said second shoulder to allow said enlarged lip to pass through said second recess part for locking and unlocking of said first and second connecting portions to effect connecting and disconnecting of said cover and casing members, said recess forming means including at least one aperture in its outside periphery for more readily allowing at least said second recess part to be spread by manual manipulation of said flange means, said at least one aperture being adjacent and about at least as long as said second shoulder.

2. An engine air filter container as in claim 1 wherein said second shoulder has a given arcuate length substantially less than the circumference of the said other member and said at least one aperture is circumferentially substantially coextensive with said given arcuate length of said second shoulder.

3. An engine air filter container as in claim 1 including strengthening ribs circumferentially spaced on opposite sides of said at least one aperture and connected to said flange and the exterior of said recess forming means.

4. An engine air filter container as in claim 1 wherein said first shoulder extends for the full circumference of said one connection portion, wherein the first recess part of said recess forming means extends fully around said other member and said recess forming means includes a plurality of said second shoulders at spaced circumferential distances, there being a respective one of said second recess parts and flange means on opposite horizontal ends of each of said second shoulders.

5. An engine air filter container as in claim 4 including a plurality of spaced groups of circumferentially spaced apertures in the outside periphery of the said first recess part of said recess forming means, one of said groups including the said at least one aperture, said groups of apertures being respectively adjacent said flange means to aid the spreading of said second recess parts when the respective flange means is manually manipulated as aforesaid.

6. An engine air filter container as in claim 5 including a plurality of strengthening ribs respectively on opposite sides of one of said apertures in each group thereof, and being connected between the respective flange means and said outer wall of said recess forming means.

7. An engine air filter container as in claim 1 wherein said one connection portion is said upper end first connection portion of said casing member and said other connection portion is said outer edge second connection portion of said cover member.

8. An engine air filter container as in claim 1 wherein said air inlet means includes an air inlet aperture and said upstanding circumferential side of said casing member has an inside flat surface surrounding said air inlet aperture in said side and from which said air inlet means protrudes exteriorly in the form of a hollow branch pipe extending horizontally, and a resilient air inlet pipe having an enlarged shouldered end with means for allowing reduction of said enlarged end upon insertion of the enlarged end through said branch pipe for locking the shouldered end of said air inlet pipe against the said inside flat surface, said inlet pipe being disposed in said hollow branch pipe with the said shouldered end of said inlet pipe against said inside flat surface.

9. An engine air filter container as in claim 8 wherein said enlarged end reduction means includes at least one longitudinally extending slit in the enlarged end of said inlet pipe.

10. An engine air filter container as in claim 8 wherein said branch pipe has at least a diverging portion in its outward extension, and wherein said air inlet pipe has a mating converging portion for preventing insertion of said inlet pipe into said branch pipe more than enough to allow said shouldered enlarged end to tightly engage said flat inside surface of said vertical wall of the enclosure member.

11. An engine air filter container as in claim 8 wherein said branch pipe extends outwardly with an internal constant diameter, and wherein said inlet pipe has an external diameter at its outer end larger than said internal diameter, said inlet pipe having a stepped restriction to said internal diameter for allowing insertion of the inlet pipe into said branch pipe for a distance sufficiently only for said shouldered enlarged end to tightly engage said flat surface.

12. An engine air filter container as in claim 1 wherein said second recess part has a radial width approximating the said given radial width of said first part of the said one connection portion.

13. An engine air filter container as in claim 12 wherein said radial width of said second recess part is less than said given radial width.

14. In an air filter container for use with an engine air filter element, comprising:
- an enclosure constructed to contain said air filter element, said enclosure having a vertical side wall with an inside flat surface with a hollow branch pipe extending horizontally from an opening in said side wall, and
- a resilient air inlet pipe having an enlarged shouldered end with means for allowing reduction of said enlarged end upon insertion of the enlarged end through said branch pipe for locking the shouldered end of said inlet pipe against the said inside flat surface of said vertical side wall,
- said inlet pipe being disposed in said hollow branch pipe with the said shouldered end of said inlet pipe against said inside flat surface of said vertical side wall,
- said enclosure having air outlet means,
- said branch pipe having at least a diverging portion in its outward extension, and
- said air inlet pipe having a mating converging portion for preventing insertion of said inlet pipe into said branch pipe more than enough to allow said shouldered enlarged end to tightly engage said flat inside surface of said vertical wall of the enclosure member.

15. An engine air filter container as in claim 14 wherein said enlarged end reduction means includes at least one longitudinally extending slit in the enlarged end of said inlet pipe.

* * * * *